D. LANE.
Machine for Sawing Shingles.

No. 200,546. Patented Feb. 19, 1878.

2 Sheets—Sheet 1.

Attest:
F. H. Schott.
D. P. Lowe

Inventor:
Dennis Lane
Jno. H. Tasker & Co.
attys

2 Sheets—Sheet 2

D. LANE.
Machine for Sawing Shingles.

No. 200,546. Patented Feb. 19, 1878.

Attest:
F. H. Schott
D. P. Cowl

Inventor:
Dennis Lane
p. J. E. Tasker & Co
attys

UNITED STATES PATENT OFFICE.

DENNIS LANE, OF MONTPELIER, VERMONT, ASSIGNOR TO THE LANE MANUFACTURING COMPANY, OF SAME PLACE.

IMPROVEMENT IN MACHINES FOR SAWING SHINGLES.

Specification forming part of Letters Patent No. 200,546, dated February 19, 1878; application filed January 22, 1878.

*To all whom it may concern:*

Be it known that I, DENNIS LANE, of Montpelier, in the county of Washington and State of Vermont, have invented certain new and useful Improvements in Shingle and Heading Machines; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to that class of shingle-machines in which the shingles are sawed by means of a circular saw from blocks of wood cut to the length of the shingles to be manufactured from it, placed on a reciprocating carriage and automatically presented to the saw as the shingles are cut from the block at each reciprocation of the carriage, the principal object aimed at being to secure perfect accuracy in the setting of the block to the saw, so that it shall move forward an equal distance whether the block be large and heavy or light, thus securing an equal thickness to all the shingles manufactured from a block; also, to improve the means used for putting the carriage in motion or stopping its automatic reciprocations, and the devices for raising the upper feed-roll when a new block is to be placed upon the carriage; and the invention consists in adding to the machine an automatically-acting gage, which comes into position when the block is to be set forward, but retreats as the block advances upon the saw; also, in the devices employed for controlling the movements of the carriage and raising one of the feed-rolls for the purpose of placing a fresh block in the machine; and, further, in other combinations of devices, which will be first fully described, and then specifically pointed out in the claims.

Figure 1:
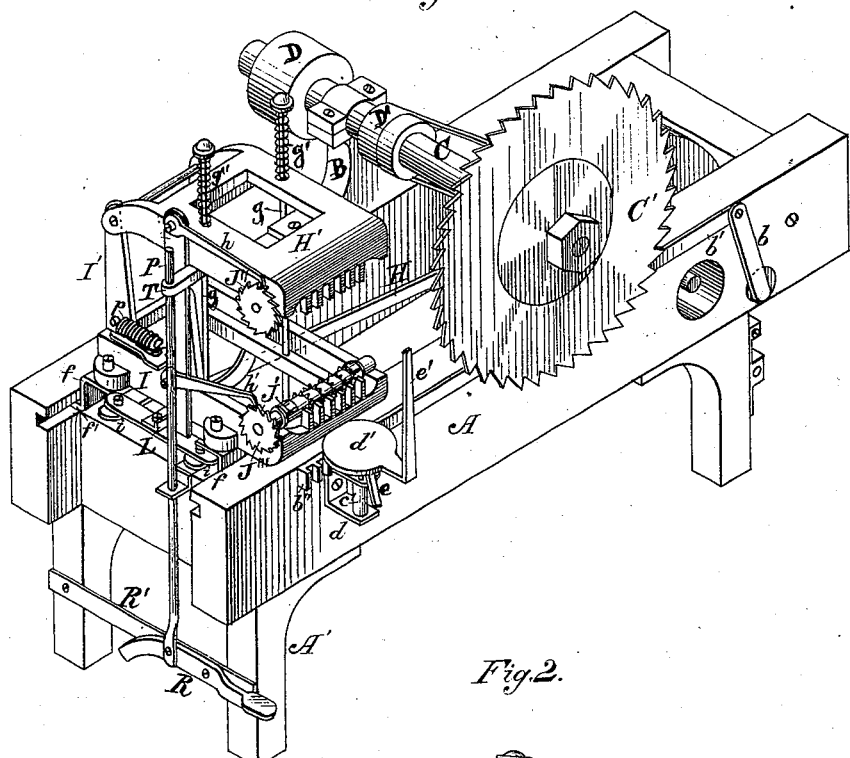
Figure 2:
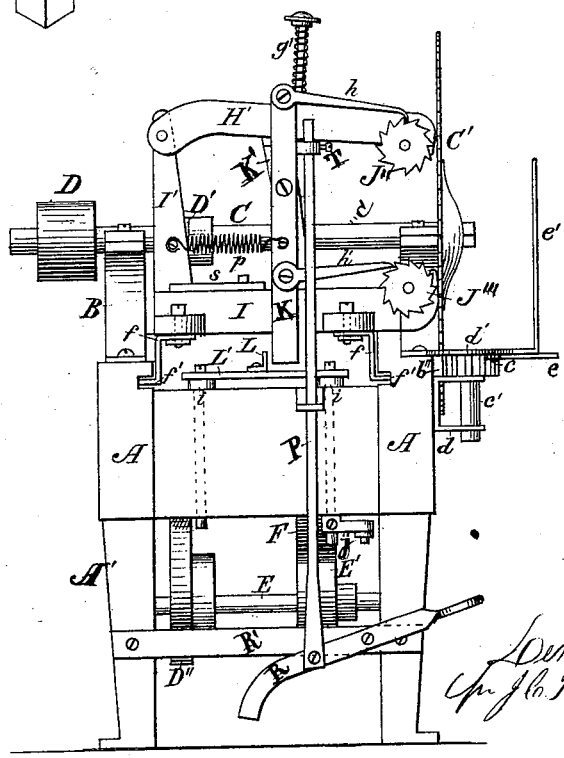
Figure 3:
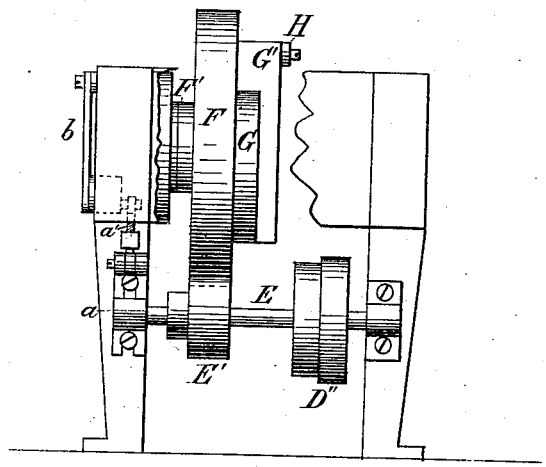
Figure 4:
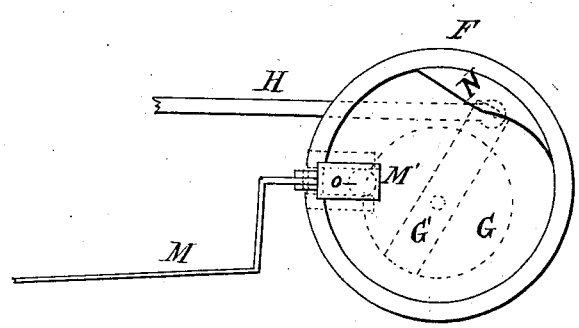

In the accompanying drawings, Figure 1 is a perspective view of the machine, from the operator's stand-point, showing the relative arrangement of the carriage, with a part of the setting and operating mechanism. Fig. 2 shows the front end of the machine with a side elevation of the carriage. Fig. 3 is a rear view, a part of the frame being broken away to show the cam-wheel and crank-shaft. Fig. 4 is a detail view of the cam-wheel and its connections.

A represents the frame of the machine, which may be constructed of either wood or metal, and placed on legs A', to bring it to a suitable height.

Mounted upon brackets B secured to the top of the frame are the journal-boxes which support the saw-arbor C, carrying upon one of its ends the saw C', and upon the opposite end the driving-pulley D, by a belt upon which, from any suitable motor, motion is communicated to the saw-arbor, and from that to the other parts of the machine.

A cone-pulley, D', is secured upon the saw-arbor, from which a belt passes to a similar pulley, D'', upon the counter-shaft E. This counter-shaft revolves in bearings attached to the legs of the frame, and carries a friction-pulley, E', which engages with the cam-wheel F.

The bearing a, which supports one end of the shaft E, is made vertically adjustable by means of a link, a', connecting with the horizontal arm of the bell-crank b. To the upper end of the vertical arm of this bell-crank is jointed the rod b', which rests in brackets by the side of the frame, and is provided at its forward end with a toothed rack, b'', into which gears the pinion c upon the vertical shaft c', which revolves in bearings in the bracket d. To the top of this shaft c' is secured a horizontal circular disk or table, d', on which to rest the new block while removing the slab of the old one. A handle, e, is attached to this partially-revolving table, for starting and stopping the carriage, and projecting upward from it is a guard, e', that swings around with the table and comes in front of the saw whenever the carriage is at rest, thus protecting the operator. The handle e forms a device by which the pinion c may be turned to the right or left. Turning the handle in one direction by means of the intermediate connections will cause the friction-pulley E' to engage with the cam-wheel F, while rotation of the handle in the opposite direction will disengage them, thus enabling the operator standing by the handle e to give motion to the cam-wheel, and through it to the carriage, or, when the latter is in motion, to stop it instantly. The cam-wheel F revolves upon a stud projecting from the bearing-plate F', or a short shaft may project from the cam-wheel into the bearing-plate and revolve therein, the principal point being to give a firm center of rotation to the cam-wheel, which is provided upon its outer side with a disk, G, carrying the crank-bar G'.

Attached to a suitable crank-pin in the crank-bar is the connecting-rod H, by which the rotation of the crank is converted into a reciprocating motion of the carriage I, which rests upon the sliding knees $f$, that reciprocate with it in grooves $f'$, formed in the side pieces of the frame A. Two standards, I', project vertically from the back side of the carriage, and have pivoted to their upper ends the swinging frame H', carrying the upper feed-roll J, the lower feed-roll J' having its bearings in the sides of the carriage I. Two vertical rods, $g$, pass through the swinging frame H' and downward through the carriage, being provided at their upper ends with spiral springs $g'$ and adjusting-nuts, which encircle the rods and press down upon the frame H', causing the feed-rollers to seize and hold firmly the shingle-blocks when placed between them.

In order to give the proper motion to the feed-rollers, a lever, K, is pivoted to the vertical standard K', which rises from one end of the carriage, and is provided, at points equidistant from its pivot, with pawls $h$ and $h'$, the first of which engages with the ratchet-wheel J'', and the other with a similar wheel, J''', both of them being attached to the feed-rollers. In cutting shingles having a thick and thin end these ratchet-wheels are formed with teeth having alternately a long and short space between them, and they are so placed that when the upper roll moves through a long space the lower one shall move a short distance, and vice versa, thus causing a point and butt of successive shingles to be alternately cut at each end of the block. To give motion to this lever K, an incline, L, is attached to the swinging bar L', mounted upon the cranks $i$ $i$, secured to the upper ends of vertical shafts, which pass downward through one of the end pieces of the frame of the machine. To the lower end of one of these shafts is secured the crank-arm $j$, to which is attached one end of the cam-rod M, its opposite end being pivoted to the slide M', which reciprocates in guides attached to one side of the frame. This slide M' carries a pin, $o$, which enters a groove in the side of the cam-wheel.

At the moment when the carriage is at the end of its movement from the saw, and ready to set the block forward for the next shingle, the projection N within the cam-wheel strikes the pin $o$, forces it forward, and, through the connecting mechanism, moves forward the incline L, so that the lower end of the lever K shall come in contact with it, thus moving the lever laterally, and at the same time, through the agency of the pawls and ratchets, giving a partial rotation to the feed-rollers. After having moved forward the block into position for the next cut, the pawls and lever are brought back to their normal position by means of a spring, $p$, one end of which is attached to the lever and the other to the standard I', the lever being prevented from being drawn too far over by an adjustable stop, $s$, attached by a set-screw passing through a slot in the stop into the top of the carriage.

In order to raise the swinging frame H' for the purpose of introducing a fresh block, a vertically-sliding rod, P, is placed at the end of the machine, its lower end resting upon a balanced foot-lever, R, pivoted to a cross-piece, R', attached to the front of the machine.

Adjustably secured near the upper end of the rod, by a set-screw, is the lifter T, which, when the rod and lever are untouched, passes at each reciprocation of the carriage beneath the swinging frame; but when it is desired to place a new block in the machine, the operator stops the carriage at the end of its movement from the saw by means of the handle $e$; then, by pressing his foot upon the foot-lever R, the swinging frame and upper feed-roller are raised sufficiently to allow a block to be inserted.

Among the advantages to be gained by using my improved machine are, the facility of operating it through the crank which stops and starts the carriage, and the foot-lever which raises the upper feed-roll, thus allowing both hands of the operator to be used in adjusting the block without any loss of time, while the arrangement of the mechanism is such as to avoid all unnecessary friction, thus causing the machine to run with less power (while doing the same work) than those in ordinary use.

Having thus described my invention, I claim as new and desire to secure by Letters-Patent the following:

1. In a shingle-machine, a reciprocating carriage, in combination with a movable gaging-incline for feeding forward the block, actuated by a rotating cam-wheel through suitable connecting devices, as shown and described.

2. The vertically-adjustable friction-wheel E', in combination with the bell-crank and connecting-rod, provided with a toothed rack at one end, and actuated by the pinion-shaft and hand-crank for the purpose of imparting a reciprocating motion to the carriage I, or arresting that motion when desired, all substantially as set forth.

3. The crank-bar G' and its disk G, in combination with the cam-wheel F and supporting-plate F', substantially as and for the purpose specified.

4. The cam-wheel F, in combination with the slide M', provided with the pin $o$, and pivoted connecting-rod M, for the purpose of imparting a forward movement to the feed-rolls of a shingle-machine, as set forth.

5. The pivoted swinging bar K, provided with pawls $h$ $h'$, in combination with the automatically-moving gaging-incline, whereby the bar K is allowed free movement, except at the moment of setting the block forward, substantially as and for the purpose specified.

6. The vertically-sliding rod P, provided with the adjustable lifter T, in combination with the foot-lever R, for the purpose of raising the upper feed-roll of a shingle-machine, as set forth.

7. The swinging frame H' and spring-encircled rods $g$, in combination with the carriage I, as and for the purpose specified.

8. The partially-rotating table $d'$ for supporting the block, provided with the vertical guard $e'$, substantially as and for the purpose set forth.

In testimony that I claim the foregoing as my own I hereunto affix my signature in presence of two witnesses.

DENNIS LANE.

Witnesses:
  IRA P. HARRINGTON,
  GEO. W. WING.